United States Patent [19]

Matsumoto

[11] Patent Number: 4,773,884
[45] Date of Patent: Sep. 27, 1988

[54] SEPARATE LUBRICATING SYSTEM FOR MARINE PROPULSION DEVICE

[76] Inventor: Kuniyoshi Matsumoto, 35-8 Oizumi-cho, Iwata-shi, Shizuoka-ken, Japan

[21] Appl. No.: 73,065

[22] Filed: Jul. 13, 1987

Related U.S. Application Data

[62] Division of Ser. No. 874,561, Jun. 16, 1986, Pat. No. 4,708,674, which is a division of Ser. No. 797,977, Nov. 14, 1985, Pat. No. 4,615,305, which is a division of Ser. No. 610,847, May 16, 1984, Pat. No. 4,572,120.

[30] Foreign Application Priority Data

| May 17, 1983 | [JP] | Japan | 58-84996 |
| May 17, 1983 | [JP] | Japan | 58-84997 |
| May 23, 1983 | [JP] | Japan | 58-89175 |
| May 23, 1983 | [JP] | Japan | 58-89176 |
| May 23, 1983 | [JP] | Japan | 58-89177 |
| May 23, 1983 | [JP] | Japan | 58-89178 |
| May 24, 1983 | [JP] | Japan | 58-89973 |

[51] Int. Cl.$^4$ .......................... B63H 21/10
[52] U.S. Cl. ................... 440/88; 123/73 AD
[58] Field of Search ............ 440/88, 89; 114/150; 417/199 A, 200; 123/73 AD

[56] References Cited

U.S. PATENT DOCUMENTS 3,130,878  4/1964  Zimmermann ............... 417/199 A
4,403,578  9/1983  Iwai et al. .................. 123/73 AD Primary Examiner—Sherman D. Basinger
Assistant Examiner—Jesús D. Sotelo
Attorney, Agent, or Firm—Ernest A. Beutler

[57] ABSTRACT

Several embodiments of separate lubricating systems for two-cycle internal combustion engines and particularly those of outboard motors. In each embodiment, the lubricating system includes a relatively large lubricant storage tank that is adapted to be carried in the hull of the associated watercraft and a relatively small lubricant delivery tank carried by the engine of the outboard motor. A pump is provided for transferring lubricant from the storage tank to the delivery tank and warning devices are incorporated to indicate when the level in each of the tanks falls below a predetermined value. Furthermore, the transfer pump is disabled upon the falling of the level of the liquid in the storage tank below a predetermined value. The pump is positioned in proximity to this storage tank and is juxtaposed and plumbed in such a way that it will not pick up foreign particles from the bottom of the tank, but will always have its inlet and outlet subject to liquid so that the pump will not run dry. A system is provided for disabling the pump if the motor is tilted up and the delivery tank is vented in such a way that lubricant will not be spilled when the engine is tilted up and regardless of its angular position. Several embodiments of arrangements are disclosed for delivering lubricant from the delivery tank to the various components of the engine.

5 Claims, 13 Drawing Sheets

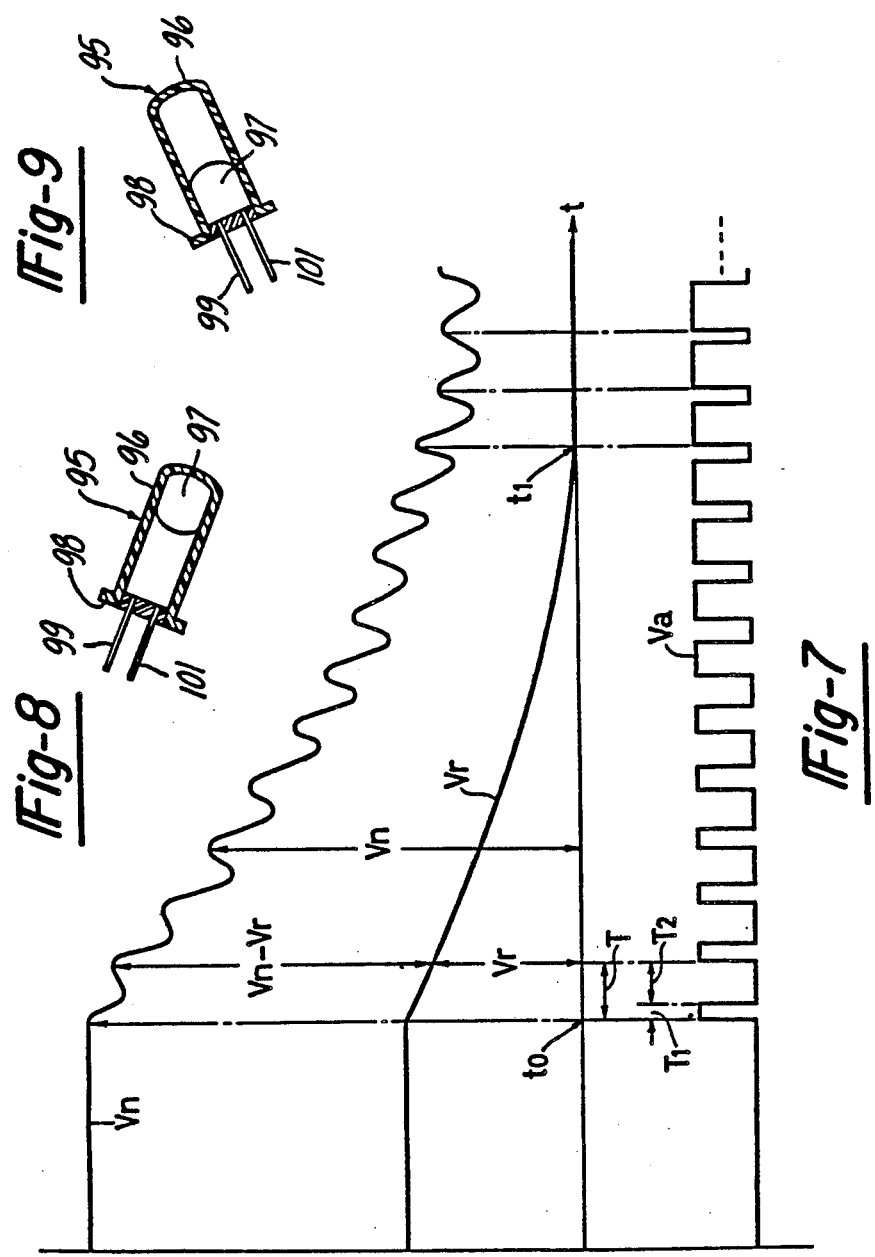

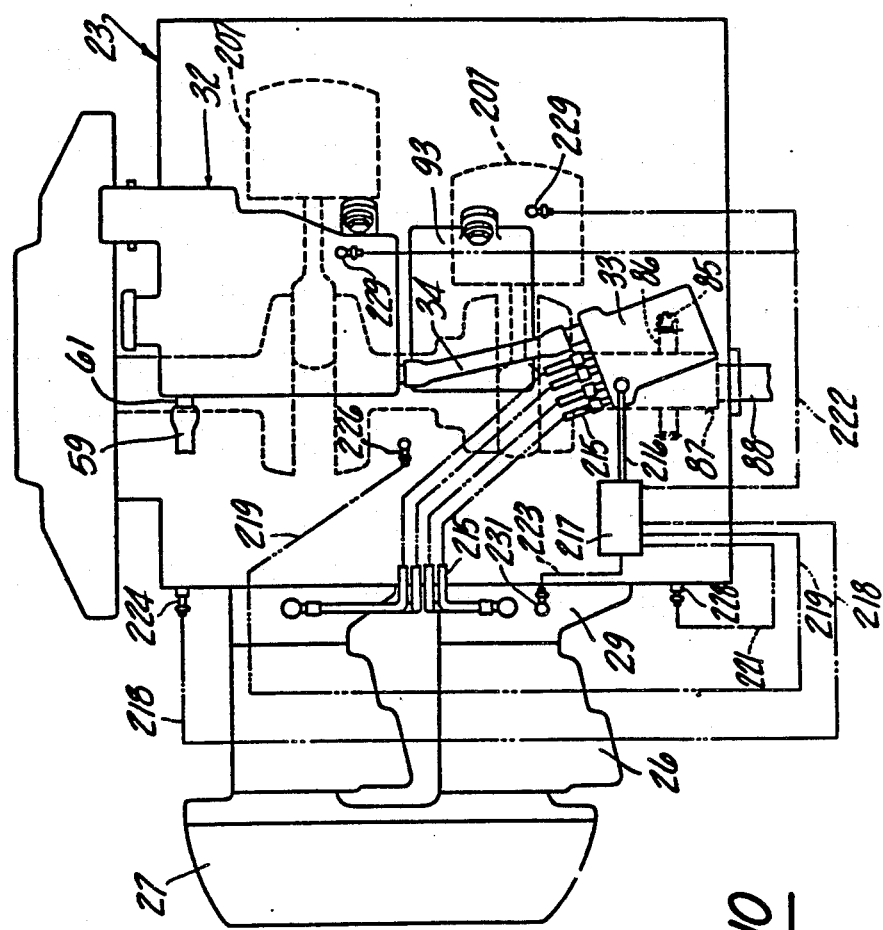

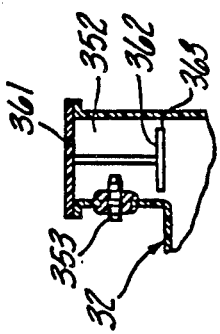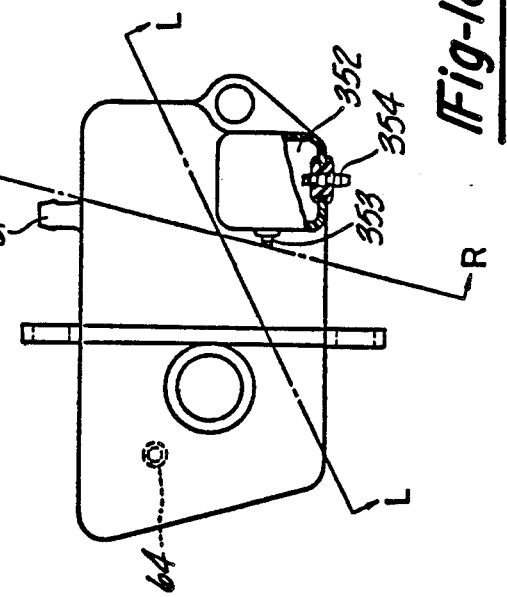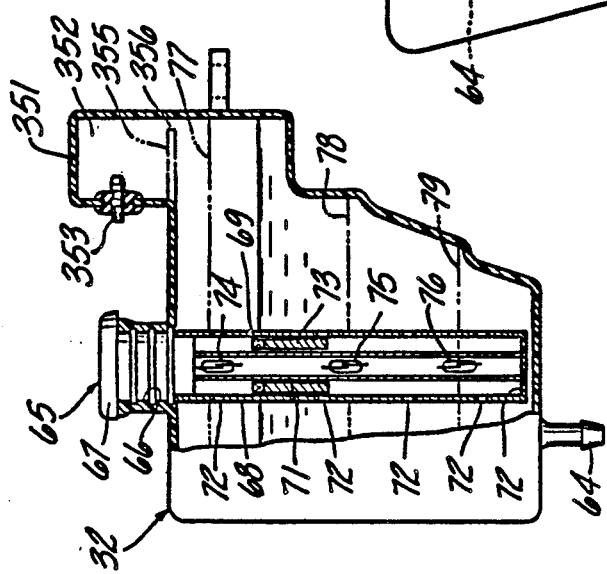

SEPARATE LUBRICATING SYSTEM FOR MARINE PROPULSION DEVICE

This is a division of U.S. patent application Ser. No. 874,561, filed June 16, 1986 now U.S. Pat. No. 4,708,674, which is a division of Ser. No. 797,977 filed November 14, 1985, now U.S. Pat. No. 4,615,305, which is a division of Ser. No. 610,847 filed May 16, 1984, now U.S. Pat. No. 4,572,120 which has been reissued as U.S. Pat. No. Re. 32,593.

BACKGROUND OF THE INVENTION

This invention relates to a separate lubricating system for marine propulsion device and more particularly to an improved lubricating system for a two-cycle engine, and particularly that of an outboard motor.

With two-cycle internal combustion engines, it has been the general practice to lubricate the engine by mixing lubricating oil with the fuel mixture. Although such arrangements offer extreme simplicity, the mixing of lubricating oil with the fuel can be troublesome to the user of the engine. In addition, the requirement for mixing lubricant with the fuel and lubricating the components of the engine with the fuel/air mixture does not always insure the adequate amount of lubrication to the various components to be lubricated under all running conditions. In order to obviate some of these difficulties, it has been proposed to provide a lubricating system where the lubricant is contained within a separate tank from the fuel and is supplied to the engine during its running. Such arrangements have a number of advantages.

When the engine in question constitutes the power unit of an outboard motor, however, the provision of such separate lubricating systems can give rise to certain problems. Due to the relatively compact nature of an outboard motor, it is difficult to provide the necessary lubricant storage capacity within the confines of the motor. That is, it is desirable that the lubricant system contain sufficient lubricant for long running periods. However, it is difficult to provide an adequate lubricant storage system within the cowling of an outboard motor for such extended running periods. Although these problems may be overcome through the use of a lubricating system wherein the lubricant is stored externally of the engine, such external storage systems themselves give rise to certain problems. For example, it is necessary to deliver the lubricant from a remote location to the engine immediately upon startup and even during cranking so as to ensure adequate lubrication during this extremely critical running condition. Such remotely positioned lubricant tanks, however, make it difficult to ensure adequate lubrication during startup. Therefore, it has been proposed to use a lubricating system wherein the engine mounts a relatively small lubricant delivery tank and lubricant is delivered to this lubricant delivery tank from a remotely positioned lubricant storage tank. An arrangement is provided wherein a substantially constant head of lubricant is maintained in the lubricant delivery tank so as to ensure adequate lubrication under all running conditions. An example of such a lubricating system is shown in U.S. Pat. No. 4,403,578, entitled "Separate Lubricating System For Outboard Engine", issued Sept. 13, 1983 in the name of Tomio Iwai and assigned to the assignee of this application. Although systems of this type have great utility and overcome many of the disadvantages of prior art two-cycle engine lubricating systems, still further improvements are desirable. For example, it is desirable to provide a system wherein a warning is given to the engine operator if the amount of lubricant in the storage tank falls below a predetermined amount so that the lubricant in the storage tank may be replenished.

It is, therefore, a principal object of this invention to provide an improved lubricating system for a two-cycle internal combustion engine.

It is a further object of this invention to provide an improved lubricating system for an outboard motor that embodies a remotely positioned lubricant storage tank and an engine-mounted lubricant delivery tank with a device for transferring lubricant from the storage tank to the delivery tank and further including means for providing a warning when the amount of lubricant in the delivery tank falls below a predetermined value.

In addition to provide a warning when the amount of lubricant in the storage tank falls below a predetermined amount, it is also desirable with lubricating systems of this type to provide some means for insuring against the complete depletion of the amount of lubricant in the system during long cruising periods.

It is, therefore, a still further object of this invention to provide an improved lubricating system for a two-cycle engine in which the depletion of lubricant from the separate lubricating system can be avoided during long running periods.

It is a further object of this invention to provide a system for reducing engine speed to conserve lubricant when the amount of lubricant in the separate lubricating system falls below a predetermined value.

As has been noted, there are a number of advantages in providing a separate lubricating system for an internal combustion engine of the two-cycle type that employs a relatively small lubricant delivery tank mounted on the engine and a larger lubricant storage tank that is remotely positioned and which is adapted to supply lubricant to the engine-mounted lubricant delivery tank. Such lubricating systems have particular utility in connection with outboard motors. It is also desirable to provide the operator with an indication or warning when the lubricant in either of the tanks falls below a predetermined value. For example, if the lubricant in the delivery tank falls below a predetermined value and there is still adequate lubricant in the storage tank, the operator will know that there is some fault in the system for delivering lubricant from the storage tank to the delivery tank. On the other hand, if the amount of lubricant in the storage tank falls below a predetermined value and there is still adequate lubricant in the delivery tank, the operator will know that it is time to replenish the lubricant in the storage tank, but also will be confident that there is adequate lubricant available to lubricate the engine for a period of time.

It is, therefore, a still further object of this invention to provide a lubricating system for a two-cycle internal combustion engine that embodies a lubricant delivery tank and a lubricant storage tank and means for providing an indication to an operator when the level in either tank falls below a predetermined amount.

The advantages of separate lubricating systems for two-cycle outboard motors incorporating a small lubricant delivery tank mounted internally within the cowling of the outboard motor and a remotely positioned lubricant storage tank have been stressed. Such systems should employ an arrangement for pumping lubricant from the storage tank to the delivery tank when the level of lubricant in the delivery tank falls below a predetermined amount. However, it is the normal practice to mount outboard motors for tilting about a horizontally disposed axis from a normal running condition to either a trim up or a tilted up out-of-the-water position. If the lubricant delivery tank is mounted on the outboard motor and the motor is tilted up, the lubricant in the delivery tank will flow to another orientation which may give a low level indication that could cause further lubricant to be delivered from the storage tank to the delivery tank. This would be undesirable when the outboard motor is tilted up since the delivery tank would be overfilled when the motor was again tilted down.

It is, therefore, a still further object of this invention to provide an improved lubricating system for an outboard motor which insures against the overfilling of the lubricant delivery tank when the motor is in a tilted up condition.

In conjunction with the use of separate lubricating systems and particularly those for outboard motors that employ a relatively small lubricant delivery tank mounted by the engine and periodically replenished from a remotely positioned storage tank, it is necessary to provide some arrangement for venting the area above the lubricant in the delivery tank to the atmosphere so as to compensate for changes in the amount of lubricant in the tank. Although such venting may be conveniently performed by means of a pressure responsive check valve at an upper level in the tank, the fact that the outboard motor is tiltable about a horizontally disposed axis, as aforenoted, somewhat complicates the venting arrangement. Furthermore, the fact that the outboard motor is also steerable about a vertically extending axis and may tilted up when steered to either an extreme right or lefthand position can further complicate matters. Unless the venting system is properly arranged, the tilting up of the motor can cause the lubricant to be discharged through the venting system and foul the motor and the surrounding area.

It is, therefore, a still further object of this invention to provide an improved venting system for a separate lubricating system for a two-cycle internal combustion engine.

It is a further object of this invention to provide an improved venting system for an outboard motor embodying a motor-mounted lubricant delivery tank that will insure against the spillage of lubricant regardless of the orientation of the motor.

In separate lubricating systems of the type embodying an engine-mounted lubricant delivery tank and a remotely positioned lubricant storage tank with a pumping device for pumping lubricant from the storage tank to the delivery tank, it has been the practice to mount the pump in or in proximity to the storage tank so as to insure that it will always be primed and available to pump lubricant to the delivery tank when required. If the pump is mounted externally of the storage tank and at a low level, it is likely to become contaminated and damaged by the debris which may accumulate in the bottom of the hull of the watercraft. Although these problems can be avoided by mounting the external pump at a higher level, this can itself cause problems. If the pump is not mounted at the lowest level in the tank, there may be situations wherein the pump will cavitate when the oil level in the tank falls to a point where it is at or near the level of the lubricant pump. Such cavitation can cause damage to the pump and other problems.

It is, therefore, a further object of this invention to provide an improved separate lubrication system for a two-cycle engine wherein pump cavitation may be avoided.

It is a further object of this invention to provide an improved pumping arrangement for the storage tank of a separate lubricating system of the type described that insures against damage to the pump by cavitation.

As has been noted, the mixing of lubricant with the fuel has been a well known method for lubricating two-cycle internal combustion engines. The induction systems for such engines normally cause the fuel and lubricant to pass across most, if not all, of the components of the engine to be lubricated. Thus, even if a separate lubricating system is incorporated which does not employ the mixing of lubricant directly with the fuel in the fuel storage tank, it has been the practice to inject lubricant into the induction system so that it will mix with the intake charge and be delivered to the various components of the engine. Such arrangements have the advantage of permitting more accurate control over the amount of lubricant delivered, but also have the advantage of not requiring the operator to mix the lubicant with the fuel. However, this type of induction system and lubricating system does not always insure adequate lubrication of all components of the engine.

It is, therefore, a still further object of this invention to provide an improved lubricating system for a two-cycle internal combustion engine which offers simplicity and, at the same time, insures the adequate amount of lubrication of all components of the engine.

In connection with the use of separate lubricating systems for internal combustion engines of the two-cycle type, it is normally the practice to employ some form of pump for delivering lubricant, even when the lubricant is delivered merely to the induction system for mixing with the fuel/air intake charge. Hwoever, as has been noted, the amount of lubricant required by the various components of the engine may vary.

It is, therefore, a still further object of this invention to provide an improved lubricating system for a two-cycle internal combustion engine wherein portions of the lubricant are delivered to the engine under pressure and other portions are delivered in a non-pressurized manner.

SUMMARY OF THE INVENTION

A number of features of the invention are adapted to be embodied in a lubricating system for a two-cycle internal combustion engine that comprises a relatively large remotely positioned lubricant storage tank, a relatively small lubricant delivery tank positioned in proximity to the engine for delivering lubricant to its lubricating system and means for transferring lubricant from the storage tank to the delivery tank.

In accordance with a first feature of the invention as embodied in such a lubricating system, means are incorporated for providing a warning signal when the level of lubricant in the storage tank falls below a predetermined amount.

In accordance with another feature of the invention as applied to such a lubricating system, means are provided for reducing the speed of the engine when the level of the lubricant in one of the tanks falls below a predetermined value for extending the running period with the available lubricant.

In accordance with another feature of the invention as adapted to be embodied in such a lubricating system, means are incorporated for providing a first signal when the level of lubricant in one of the tanks falls below a predetermined level and means are also provided for providing a second signal when the level of lubricant in the other of the tanks falls below a predetermined level so that the operator can determine the cause of the depletion of lubricant.

Another feature of the invention is adapted to be embodied in a lubricating system of the type described for the two-cycle engine of an outboard motor that is tiltable about a horizontally extending axis and in which the lubricant delivery tank is mounted by the tiltable part of the outboard motor. In accordance with this feature of the invention, means are provided for insuring against the transfer of lubricant from the storage tank to the delivery tank when the outboard motor is tilted up.

A still further feature of the invention is adapted to be embodied in a lubricating system for an outboard motor as described in the preceeding paragraph. In accordance with this feature of the invention, means is provided for venting the delivery tank and the venting means is positioned above the level of lubricant in the delivery tank regardless of the tilted position of the outboard motor.

Yet another feature of the invention is also adapted to be embodied in a lubricating system of the type described wherein the means for transferring the lubricant from the storage tank to the delivery tank comprises a pump that is located in proximity to the storage tank and above the lower wall of the storage tank. In accordance with this feature of the invention, conduit means extend from the outlet of the pump to the delivery tank and a trap is formed in the conduit means for maintaining lubricant in proximity to the pump outlet for precluding cavitation of the pump.

Yet another feature of the invention is adapted to be embodied in a lubricating system of the type described. In accordance with such a system, there are first lubricant means that deliver lubricant from the delivery tank to the induction system of the engine for induction into the engine induction system to lubricate at least some of the engine components and second lubricating means for delivering lubricant from the delivery tank to other components of the engine independently of the induction system.

A still further feature of the invention is adapted to be embodied in a lubricating system of the type described. In accordance with this feature of the invention, a lubricant pump is provided that has an inlet which is in communication with the delivery tank. First lubricating means delivers lubricant from the lubricant pump to certain components of the engine for lubricating those certain components. Second lubricating means extend directly from the delivery tank to at least another component of the engine for lubricating that other component independently of the lubricating pump.

BRIEF DESCRIPTION OF THE DRAWINGS

FIG. 7 is a diagramatic representation explaining the operation of the engine speed control system.

FIG. 8 is an enlarged cross-sectional view showing the tilt sensing switch in the normal running condition.

FIG. 9 is an enlarged cross-sectional view, in part similar to FIG. 8, showing the tilted up condition.

FIG. 10 is an enlarged side elevational view, in part similar to FIG. 2, showing another embodiment of the invention.

FIG. 17 is an enlarged side elevational view, with a portion broken away, of a lubricant delivery tank having a venting construction constructed in accordance with an embodiment of the invention.

FIG. 18 is a top plan view of the lubricant delivery tank shown in FIG. 17.

FIG. 19 is a partial cross-sectional view showing another embodiment of venting system for a lubricant delivery tank.

DETAILED DESCRIPTION OF THE PREFERRED EMBODIMENTS

Embodiment Of FIGS. 1 Through 9

Figure 1:
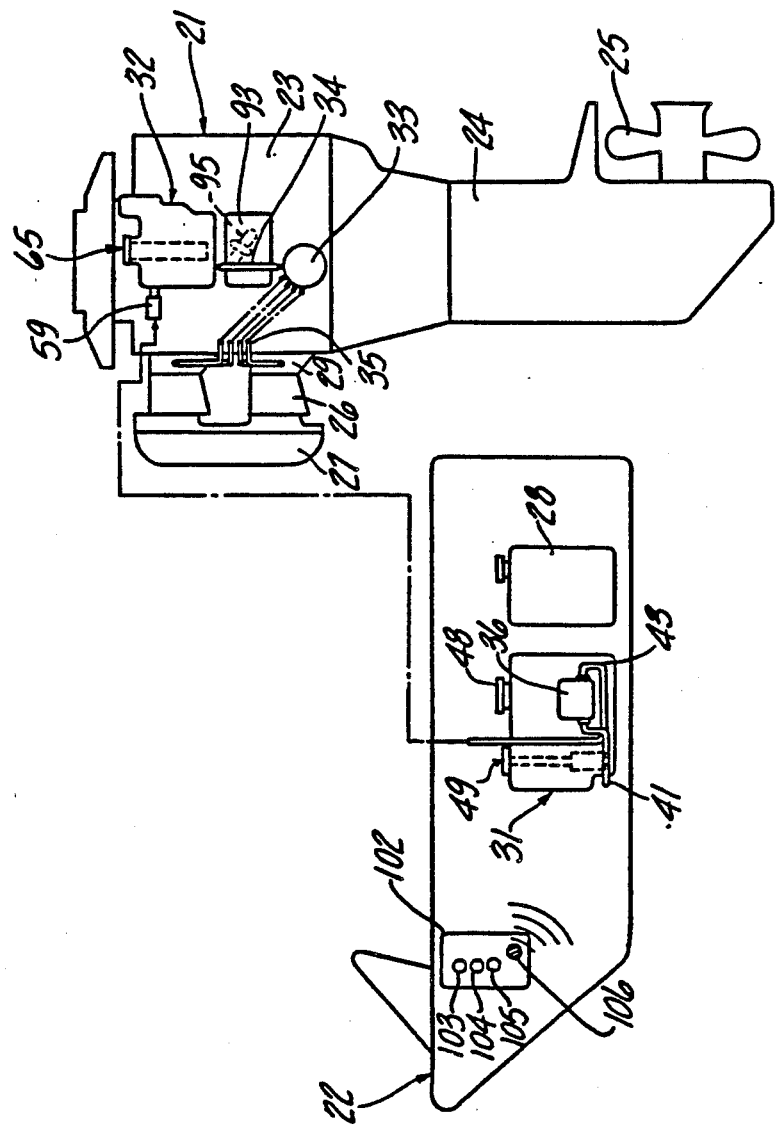
FIG. 1 is a partially schematic side elevational view of a watercraft and associated outboard motor having a separate lubricating system constructed in accordance with a first embodiment of the invention.

Referring first to the embodiment of FIGS. 1 through 9 and intially to FIG. 1, an outboard motor having a separate lubricating system constructed in accordance with an embodiment of the invention is identified generally by the reference numeral 21. The outboard motor 21 is adapted to be mounted on the transom of an associated watercraft, shown partially schematically and indicated generally by the reference numeral 22 in a known manner. This mounting arrangement permits steering movement of the outboard motor 21 about a vertically extending steering axis and tilting movement about a generally horizontally extending tilt axis between a normal running condition, a plurality of trim adjusted positions and a tilted up, out-of-the-water position.

The outboard motor 21 includes a power head consisting of an internal combustion engine 23 which, as will be noted, is of the crankcase compression two-cycle type and which may have any type of cylinder configuration. In order to more clearly show the construction, the protective cawling which normally encircles the internal combustion engine 23 has been removed and is not shown in the drawings. The motor 23 includes a driven crankshaft, which is illustrated in certain of the remaining figures, which in turn drives a drive shaft that extends through a drive shaft housing 24 and which drives a propeller 25 in a suitable manner, which may include via a forward/reverse/neutral transmission. The motor 23 includes an induction system consisting of one or more carburetors 26 that receive air from an air intake device 27 and fuel from a remotely positioned fuel tank 28 in a known manner for delivery to the individual crankcases of the engine 23 through an intake manifold 29 and appropriate read valves (not shown). This general construction of the outboard motor and its induction system is not shown in any detail because it may be of any conventional type.

In accordance with the invention, the outboard motor 21 and specifically its engine 23 is provided with a separate lubricating system so that it will be unnecessary for the operator to mix lubricant with the fuel supplied to the fuel tank 28. This separate lubricating system is comprised of a relatively large lubricating storage tank 31 that is adapted to be positioned within the hull of the watercraft 22. The lubricating system further includes a relatively small lubricant delivery tank 32 that is mounted directly to the outboard motor 23, in a manner to be described, and which is positioned within the protective cowling of the power head. Lubricant is delivered from the lubricant delivery tank 32 to a lubricant pump 33 through a conduit 34. The lubricant pump 33 then transfers the lubricant under pressure through a plurality of conduits 35 to each of the individual runners of the intake manifold 29 that serve the respective crankcase chambers of the engine 23. Since, in the illustrated embodiment, the engine 23 is of the V-4 type, there are four lubricant delivery conduits 35 each extending from the lubricant pump 33 to a respective one of the runners of the intake manifold 29.

Figure 3:
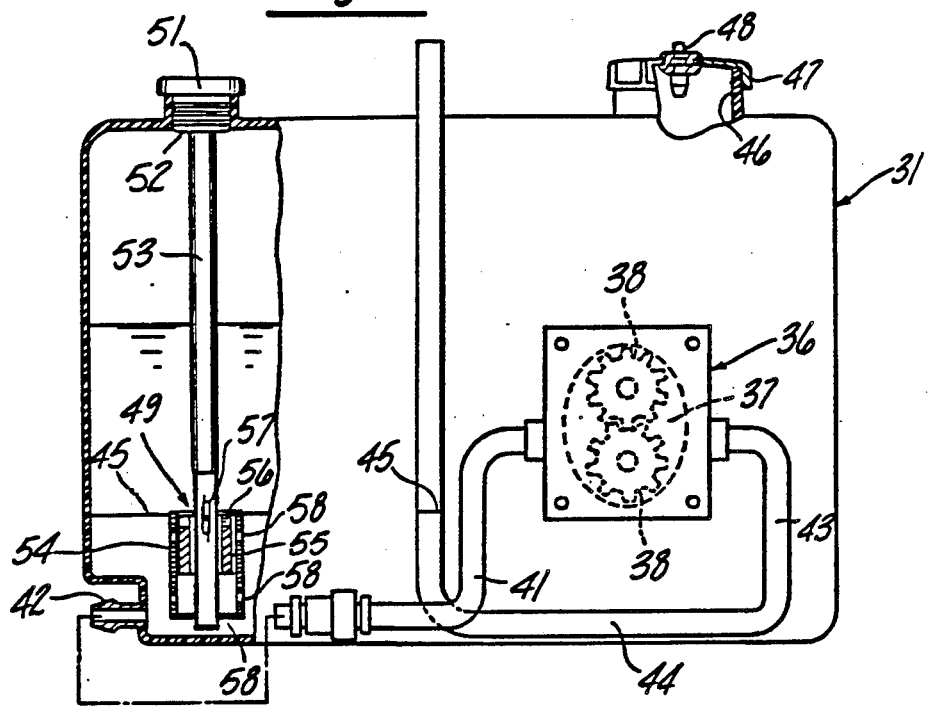
FIG. 3 is an enlarged side elevational view, with portions broken away, of the lubricant storage tank.

Referring now additionally to FIG. 3, the lubricant storage tank 31, as has been noted, has a relatively large capacity and is adapted to be positioned in the hull of the watercraft 22. Lubricant is delivered from the storage tank 31 to the delivery tank 32 by means of a pump 36 that is mounted externally of the tank 31 in a suitable manner. The pump 36 is of the positive displacement type and has a pumping cavity 37 in which intermeshing gears 38 are positioned. The gears 38 are driven by an electric motor which is not shown in this figure, but which is indicated by the reference numeral 39 in the schematic wiring diagram FIG. 5. Lubricant is delivered to the pumping cavity 37 by an lubricant delivery line 41 that extends to an inlet nipple 42 that is positioned in a lower wall of the lubricant storage tank 31. The lubricant pump discharges from its pumping cavity 37 through a delivery conduit 43 that extends to the lubricant delivery tank 32. In accordance with a feature of the invention, the delivery conduit 43 is provided with a U-shaped trap 44 so as to insure the presence of lubricant at both the inlet and outlet sides of the pump 36 even when the level of lubricant in the tank 31 is at a low condition. This level is shown by the broken line 45 in FIG. 3. It should be noted that the lubricant pump 36 is above this level. The pump 36 is positioned above the bottom of the storage tank 31 so that is less likely to be contaminated by debris which may accumulate on the floor of the hull of the watercraft 22. Even though the pump 36 is positioned above the lower level of the tank 31, the trap 44 insures that a level of lubricant to the line 45 will also be maintained in the outlet and inlet sides of the pump 36 so that if the pump is operated even with the lubricant at the level 45, the pump will not run dry.

The storage tank 31 is provided with a filler neck 46 that is closed by a cap 47 so that the quantity of lubricant in the tank 31 may be periodically replenished. A check valve type air relief or venting valve 48 is positioned in the cap 47 so as to permit air to be admitted to the tank 31 as the level of lubricant falls during operation.

A sensing device, indicated generally by the reference numeral 49, is provided so as to issue a caution signal, in a manner to be described, when the level in the tank 31 falls to or below the level 45. This sensing device 49 is carried by a cap-like member 51 that is received in a threaded opening 52 in an upper wall of the tank 31. A support rod of tubular configuration 53 extends from the cap-like member 51 into the interior of the tank 31 and carries an annular shell 54 at its lower end. Contained within this annular shell is a float 55 that is moveable from an uppermost position to a lowermost position. The float 55 has a metallic sleeve 56 that is adapted to cooperate with a sensing member or switch 57 carried by the tube 53 so as to close a circuit, in a manner to be described, as long as the level of lubricant in the storage tank 31 is above a predetermined level. If, however, the level falls below the level indicated by the line 45, the metallic sleeve 56 will move out of contact with the switch 57 and this switch will then be opened.

It should be noted that the shell 54 is positioned at the lowermost portion of the tank 31 and thus the float 55 can never rise above the line 45. In addition, restricted openings 58 extend through the wall of the shell 54 so as to permit lubricant to enter the interior of the shell at a somewhat restricted rate. This will insure that the float 55 will not cause independent opening of the switch if the level of lubricant in the tank 31 is low, but nevertheless varies due to sudden maneuvering of the watercraft 22. In this way, false caution signals will be avoided.

Figure 2:
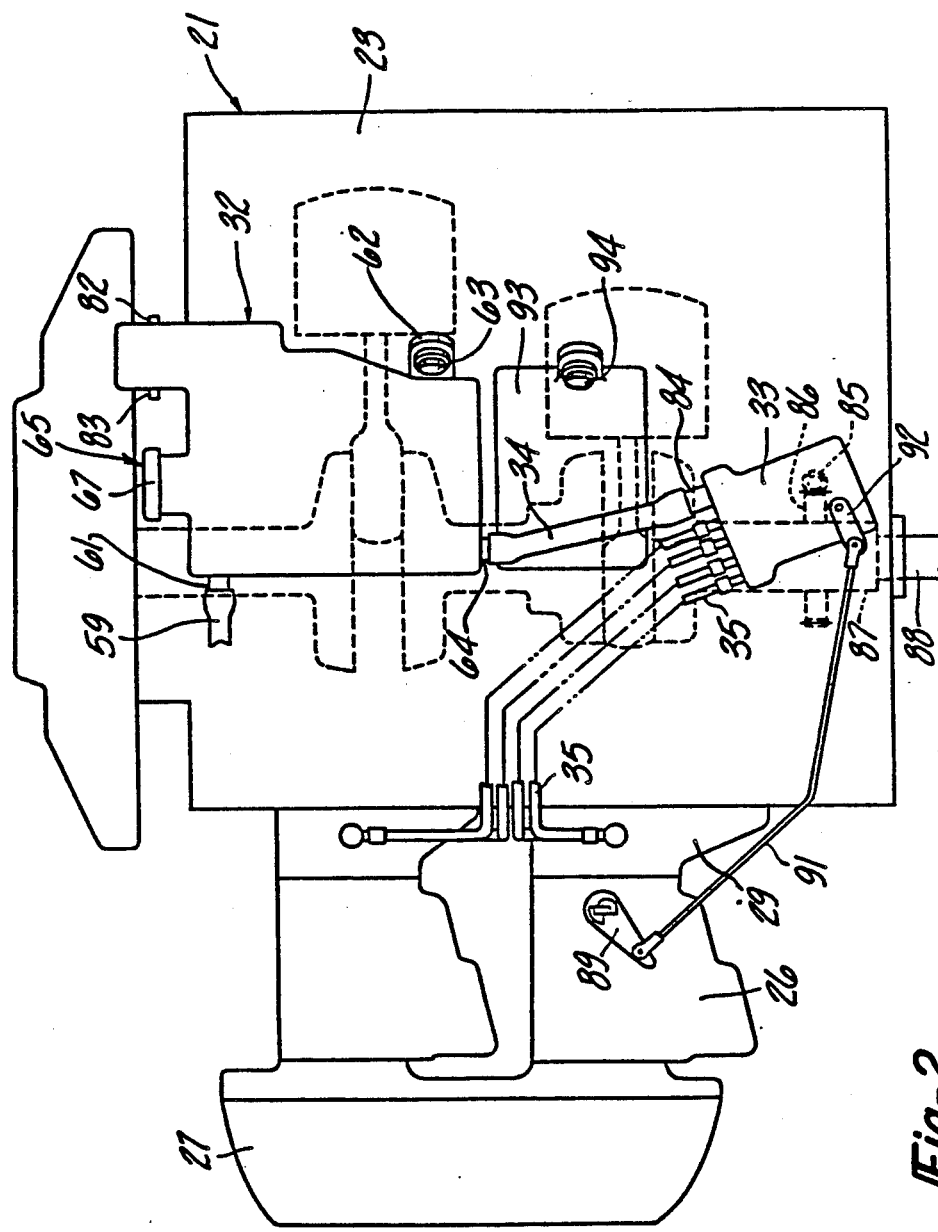
FIG. 2 is an enlarged side elevational view of the power head of the motor showing further details of the construction of the lubricating system.
Figure 4:
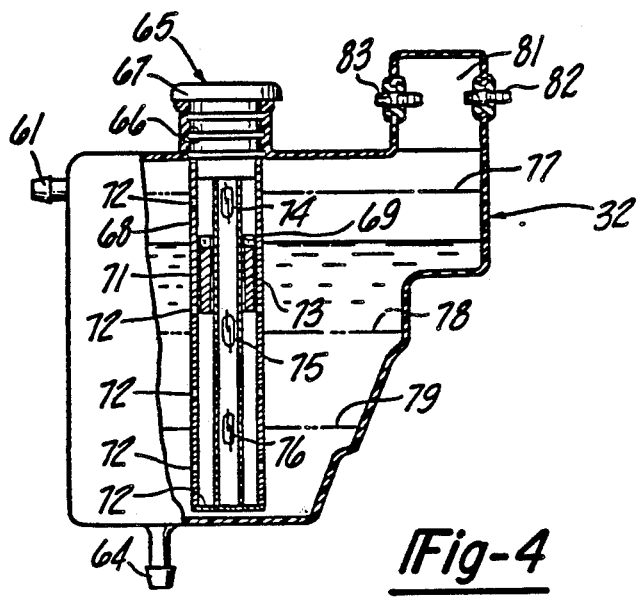
FIG. 4 is an enlarged side elevational view, with portions broken away, of the lubricant delivery tank.

Referring now additionally to FIG. 4, the constrution of the lubricant delivery tank 32 and its associated components will be described. The lubricant delivery conduit 44 communicates with a quick disconnect coupling 59 (FIG. 1) that is connected to an inlet nipple 61 formed in the upper side of the lubricant delivery tank 32. The delivery tank 32 is, in turn, mounted on the cylinder block of the engine 23 by means including a mounting bracket 62 and bolt 63 (FIG. 2). The lower end of the lubricant delivery tank 32 is provided with an outlet nipple 64 to which the conduit 34 is connected so as to transfer lubricant from the delivery tank 32 to the lubricant pump 33.

A sensing and control device, indicated generally by the reference numeral 65, is provided which is mounted in a neck opening 66 formed in an upper surface of the delivery tank 32. The sensing device 65 includes a cap 67 from which depends a tubular member 68 having a central tube 69. An annular float 71 encircles the tube 69 and is contained within the tubular member 68. A plurality of restricted openings 72 are formed in the wall of the tubular member 68 and in its lower surface so as to permit restricted communication of the lubricant in the delivery tank 32 with the interior of the tubular member 68 so that the float 71 will move to a level that is determined by the level of fluid in the tank 32. The restricted openings 72 function like the restricted openings 58 in the tubular member 54 of the storage tank 31 so as to prevent inadvertent signal transmission due to short variations in liquid level caused by sharp maneuvers of the boat 22.

The float 71 is formed with an annular inner sleeve 73 that is adapted to cooperate with one of three switching elements 74, 75 and 76 so as to provide control and warning signals. The switch 74, as will become apparent, provides a signal when the level of lubricant in the supply tank 32 is at a maximum line, indicated by the broken line 77, so as to discontinue operation of the motor 39 and pump 36. The switch 75 cooperates with the sleeve 73 so as to provide a signal when the lubricant level reaches a lower level indicated by the line 78 so as to initiate operation of the motor 39 and pump 36 so as to replenish the lubricant in the delivery tank 32. The switch 76 cooperates with the sleeve 73 so as to provide a warning signal when the lubricant level reaches a low level indicated by the line 79 in a manner which will be described.

In order to permit air to enter and leave the delivery tank 32 in response to changes in liquid level therein, its upper wall is formed with an upwardly extending recess 81 and check valves 82 and 83 are provided which communicate the recess 81 with the atmosphere so as to permit air to flow in a controlled manner in and out of the supply tank 32. The valve 83 permits air to enter and the valve 82 permits air to exit.

Referring now additionally to FIG. 2, the lubricant pump 33 has an inlet nipple 84 that communicates with the conduit 34 so that lubricant will be delivered by gravity from the delivery tank 32 to the pump 33. The pump 33 has a driving shaft to which a worm gear 85 is affixed. The worm gear 85 is enmeshed with a worm wheel 86 that is fixed for rotation with the lower end of the previously mentioned crankshaft 87 immediately above its driving connection with the drive shaft 88. Hence, the lubricating pump 33 is driven in response to the rotation of the crankshaft 87.

The output of the lubricating pump 33 is adjusted in response to throttle position and for this purpose a lever 89 is affixed to the throttle valve shaft of one of the carburetors 26. The lever 89 is pivotally connected to one end of a link 91, the other end of which is pivotally connected to a control lever 92 of the pump 33. Hence, movement of the carburetor throttle valves will, through the lever 89, link 91 and control lever 92, appropriately control the amount of lubricant delivered from the pump 33 to the manifold runners through the conduits 35.

The electrical control system for the lubricant system and its interrelationship to the engine speed control will now be described. The control circuit is depicted schematically in FIGS. 5 and 6 and includes a number of components that are positioned within a control box, indicated generally by the reference numeral 93 and which is mounted on the cylinder block of the engine 23 by means of a bolt or the like 94 (FIG. 2). Contained within the control box 93 is an engine position sensing device, indicated generally by the reference numeral 95 and shown in most detail in FIGS. 8 and 9. The engine position sensing device 95 is a mercury type switch and includes a body 96 in which a globule of mercury 97 is contained. The body 96 is closed by an insulating cap 98 from which a pair of terminals 99 and 101 extend. When the outboard motor 21 is in its normal running condition, as shown in FIGS. 1 and 8, the globule of mercury 97 will be spaced from the terminals 99 and 101 and the circuit will then be open. However, when the motor 21 is tilted up, the sensing device 95 will be rotated to the position shown in FIG. 9 and the mercury globule 97 will close the circuit between the terminals 99 and 101.

Figure 5:
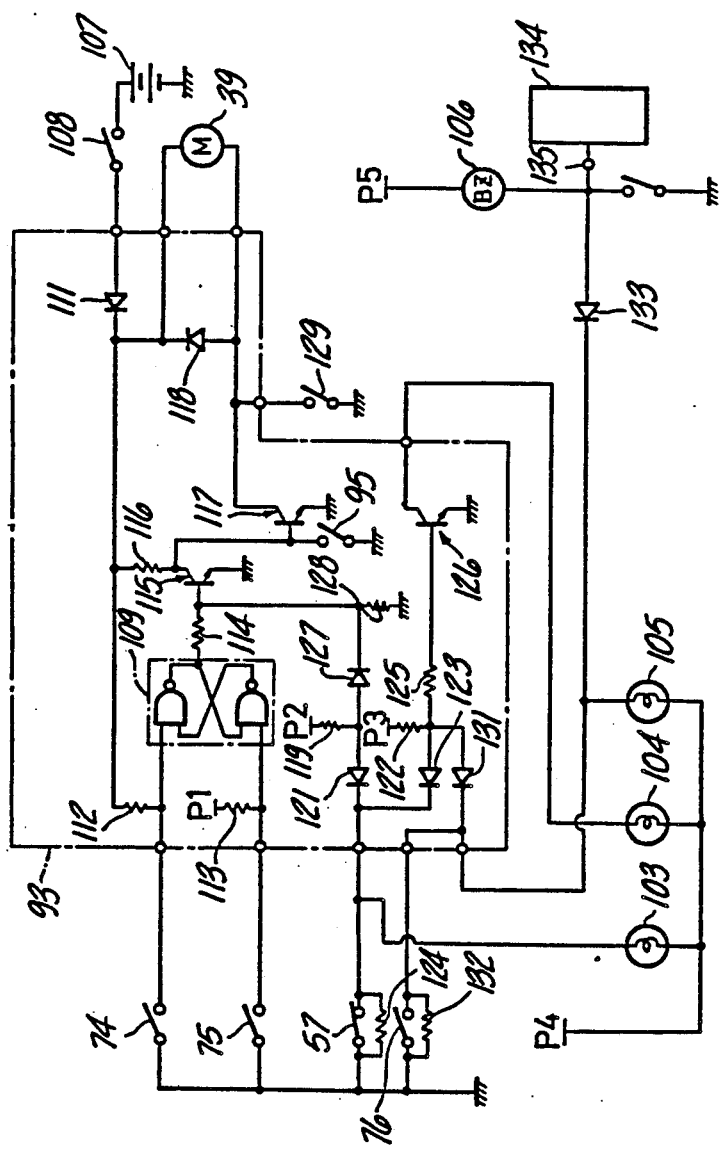
FIG. 5 is a schematic electrical diagram of the control and warning system.

Referring now additionally to FIG. 5, the system includes a panel 102 (FIG. 1) that is positioned in the watercraft 22 and which includes a green, system on light 103, a yellow warning light 104 and a red caution light 105. In addition, the panel 102 further carries a warning buzzer 106 that provides an audible warning under the caution condition, as will become apparent.

The circuit, as shown in FIG. 5, includes a power source such as a battery 107 that has one side grounded and its other side connected to a main power control switch 108, which may also be juxtaposed on the panel 102, if desired. Closure of the switch 108 will energize the points P1, P2, P3, P4 and P5 through suitable junctions (not shown). When the main control switch 108 is closed and if there is sufficient lubricant in the storage tank 31, the switch consisting of the contact 57 and float controlled sleeve 56 will be closed and the green "on" light 103 will be illuminated.

Assuming that that level of lubricant in the delivery tank 32 is also adequate so that the float 71 will be positioned between the contacts 74 and 75, these contacts 74 will be open as shown in FIG. 5. Under this condition, a flip flop 109 will be maintained in a "1" condition so that the power delivered to its one terminal through a diode 111 and resistor 112 and the power delivered to its other terminal from the point P1 through a resistor 113 will put an output voltage through a resistor 114 to the gate of a transistor 115 so that the transistor 115 will be maintained in an "on" condition. When the transistor 115 is on, the circuit containing resistor 116 will be grounded and the gate of the transistor 117 will be negative so that the transistor 117 will be off and no voltage will be supplied to the motor 39 and the pump 36 will not be operated. It should be noted that a diode 118 is positioned across the circuit of the motor 39.

As the motor 21 and specifically its internal combustion engine 23 continues to operate, the lubricant pump 33 will deliver lubricant from the delivery tank 32 to the engine induction system through the delivery conduits 35. This will cause the level of lubricant in the delivery tank 32 to be gradually depleted until it reaches the level 78 (FIG. 4). At this time, the sleeve 73 will come into registry with the switch 75 so as to close its circuit. The source P1 will now discharge through the resistor 113 to ground and change the state of the flip flop 109 to its "0" state. When this occurs, the gate of the transistor 115 is affected so as to turn the transistor "off". Turning of the transistor 115 off changes the state of the gate of the transistor 117 and it will now turn "on" closing the circuit through the motor 39 so as to energize it and the pump 36.

As the pump 36 begins to operate, lubricant will be drawn from the supply tank 31 and delivered to the delivery tank 32 through the conduit 41. As the lubricant is delivered, the float 71 will raise and again move the sleeve 73 out of registry with the switch 75 so as to open it. However, this will not change the state of the flip flop 109 and the transistor 115 will be maintained switched "off" and the transistor 117 will be maintained switched "on" so that the motor 39 and pump 36 will continue to operate.

As the level in the delivery tank 32 continues to increase, it will eventually reach the level 77 (FIG. 4) and bring the sleeve 73 into registry with the switch 74. This switch will now close and shunt the line bearing the resistor 112 to ground and thus change the state of the flip flop 109 back to its "on" state. This will cause the transistor 115 to be switched on and the transistor 117 to be switched off so that the motor 39 and pump 36 are turned off. The level of lubricant in the delivery tank 32 will then again begin to deplete and this cycling of the motor 39 and pump 36 as described will continue during the operation of the motor 21 and specifically its engine 23.

It should be noted that if for some reason the motor 21 is tilted up from its normal condition, the position responsive switch 95 will close so that the transistor 117 cannot be turned on and the motor 39 and pump 36 will not be energized even if the contact 75 is opened. Also, the green light 103 will be maintained in its illuminated condition during this entire operation.

If, during long periods of cruising, the lubricant in the supply tank 31 becomes depleted below the minimum desired line 45, the float 55 will move downwardly so that its sleeve 56 no longer contacts the switch 57 and thus will, in effect, open this otherwise normally closed switch. When the switch 57 is closed, current from the source P2 will go to the ground through this switch through a resistor 119 and diode 121. In a like manner, current from the source P3 will go to ground through the resistor 122 and diode 123. However, when the switch 57 opens due to lowering of the float 55, a protecting resistor 124 across the switch 57 offers sufficient resistance so as to cause the power from the source P3 to be delivered through a resistor 125 to the gate of a transistor switch 126 to turn this normally closed switch on and render it conductive. When the transistor switch 126 is switched on, current from the source P4 flows through the yellow caution light 104 and will cause it to become illuminated. Thus, the operator of the watercraft 22 will receive a warning indicating that the lubricant level in the supply tank 31 is low and that it should be replenished.

Opening of the switch 57 also causes current from the source P2 to no longer flow through the diode 121 due to the high resistance of the resistor 124. Therefore, current from the source P2 will flow through the resistor 119 and a diode 127 to ground through a resistor 128 so as to switch the transistor 115 on and the transistor 117 off so that the operation of the motor 39 and pump 36 will also be discontinued.

It should be noted that the yellow caution light 104 is switched on and the motor 39 and pump 36 automatically stopped before the level of lubricant in the supply tank 31 falls to its fully depleted condition. Thus, the caution light 104 will go on before the lubricant in the supply tank 31 is depleted and at a time when the level of the lubricant in the delivery tank 32 is above its level 78. Therefore, adequate warning of a low supply lubricant condition will be given to the operator.

In the event of emergency condition, the operator may switch on the motor 39 and pump 36 so as to transfer the remaining lubricant from the storage tank 31 to the delivery tank 32. This is done by closing a manual override switch 129 in the circuit of the motor 39 which the causes the motor to operate independently of the condition of the transistor switch 117.

Assuming that the level of lubricant in the supply tank 31 has fallen below the line 45 and the motor 21 is continued to be operated, the level of lubricant in the delivey tank 32 will, of course, continue to be depleted. When the level falls to the line 79, which is still above the point when the amount of lubricant in the delivery tank 32 is completely exhausted, the float sleeve 73 will register with the switch 76 and will turn it on. When the switch 76 is switched on and remembering that the switch 57 is switched off, current from the source P3 may flow through a diode 131 to the ground through the closed switch 76. As a result, the transistor 126 is again switched off and the yellow caution light 104 will also be switched off. It should be noted that there is a high resistance protective resistor 132 positioned across the switch 76 to protect it from arcing upon opening of the switch.

When the switch 76 is closed, a circuit from the source P5 through the warning buzzer 106 will be completed to the ground through the switch 76 and a diode 133. This will cause the buzzer 106 to give an audible warning to the operator. In addition, closure of the switch 76 will complete the circuit from the source P4 through the red warning light 105 to the ground and this also will be illuminated.

In addition to providing the audible and visual warning by sounding of the buzzer 106 and illuminating the red warning light 105, closure of the switch 76 also enables an engine speed control circuit, indicated generally by the reference numeral 134, so as to reduce the speed of operation of the engine 23 and to conserve the remaining lubricant in the delivery tank 32. The circuit 134 has a connection 135 to the source PS through the buzzer 106. The details of the protective speed control circuit 134 may be best understood by reference to FIG. 6, wherein this circuit is shown schematically. In addition, FIG. 7 is a graphical explanation of the operation of the circuit.

The ignition system for the engine 23 includes a magneto generator, indicated generally by the reference numeral 136, which may be of any known type and which includes a charging coil 137 and a pulser coil 138. The charging coil 137 and pulser coil 138 provide their signals and charges to a CD ignition circuit, indicated generally by the reference numeral 139.

Figure 6:
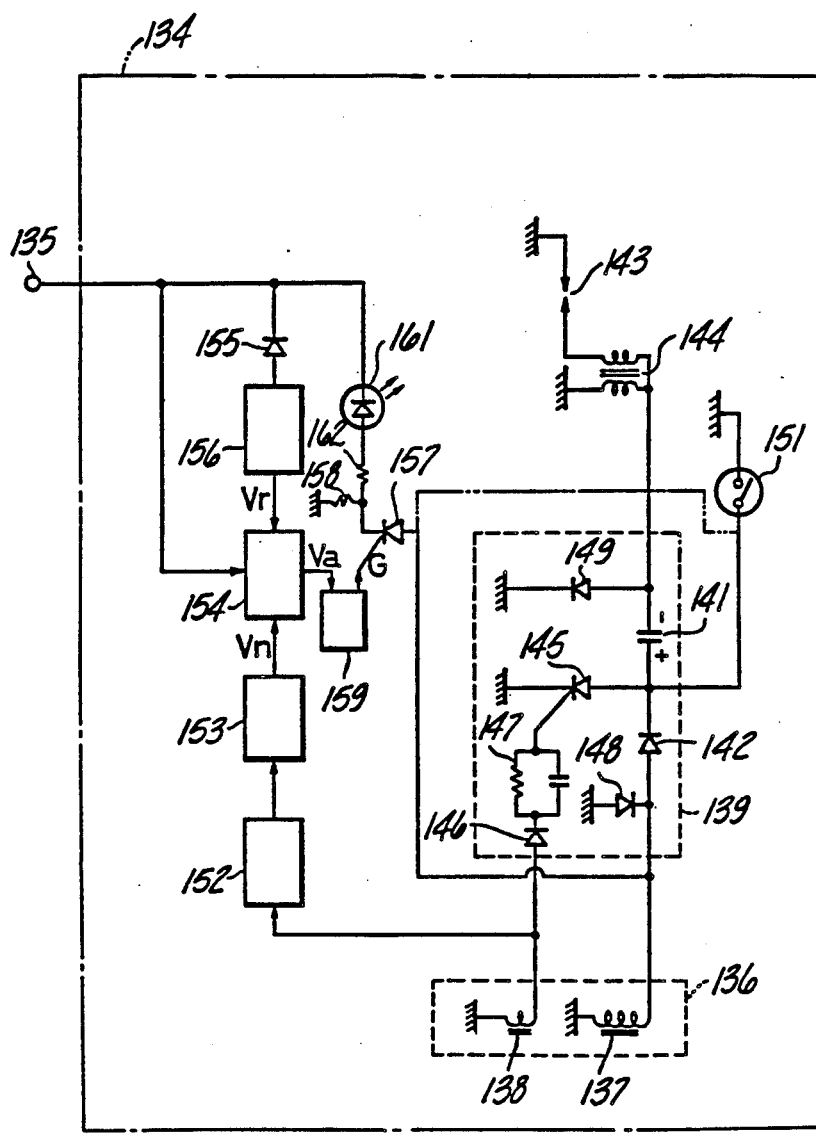
FIG. 6 is a schematic electrical diagram showing the engine ignition and speed control system.

The CDI circuit 139 includes a charging capacitor 141 that is charged from the charging coil 137 through a rectifying diode 142 to a polarity as shown in FIG. 6. A charge will be built up on the capacitor 141 during rotation of the engine crankshaft until an appropriate tripping device such as a rotating magnet causes a voltage to be generated in the pulser coil 138 to indicate that the crankshaft is in the appropriate position to demand firing of a spark plug 143. Of course, there will be one spark plug for each cylinder of the engine 23 and the circuit shown in FIG. 6 is that associated with only a single cylinder of the engine. It should be understood that there will be corresponding circuits for each of the spark plugs of the engine 23. However, it should also be understood that other ignition circuits than that illustrated may be used in conjunction with the invention.

The spark plug 143 is in circuit with a secondary winding of a spark coil 144. The primary winding of the coil 144 is in circuit with the charging capacitor 114 and is adapted to be discharged to ground through an SCR switch 145 under the control of a circuit energized by the pulser coil 138. A tripper signal from the pulser coil 138 is transmitted through a diode 146 and capacitor resistor circuit 147 to the gate of the SCR 145 so as to turn it on and cause the capacitor 141 to discharge. This discharge through the primary winding of the spark coil 144 will cause a voltage to be induced in the secondary winding which will fire the spark plug 143 in a known manner. A diode 148 is placed between the ground and the connection of the coil 137 to the diode 142 of providing a circuit during the negative half wave of the charging coil 137. A similar diode 149 is provided between the capacitor 141 and the primary of the spark coil 144 and the ground.

A master ignition switch 151 is provided for grounding the circuit to disable the ignition system when the operator wishes to switch the engine 23 off. As has been noted, this portion of the ignition system may be considered to be generally conventional and forms no part of the invention.

As has been noted, a device is incorporated for reducing the running speed of the engine 23 when the warning condition exists and the lubricant in the delivey tank falls below the line 79. This speed reducing system is effective to cause the spark plugs 143 not to be fired for increasing time intervals during a given period of time so that the spark plug 143 will only fire once every several revolutions of the engine until the speed is reduced to a level wherein the consumption of lubricant will be substantially reduced. The speed reducing device includes a wave form shaping circuit 152 that receives the outputs from the pulser coil 138 and generates a square wave form pulse from them. This pulse is transmitted to a frequency to voltage converter 153 that provides an output voltage $V_n$ that is indicative of the engine speed. When the terminal 135 is energized, an input will also be provided to an oscillation circuit 154 which receives an input from the frequency to voltage converter in the form of the signal $V_n$ from the converter circuit 153.

Closure of the circuit including the terminal 135 also causes power to be delivered through a diode 155 to a delay circuit 156 which has an output $V_r$ that is also delivered to the oscillator circuit 58. The time delay circuit 156 operated like a capacitor in that its output signal $V_r$ decays along a curve as shown in FIG. 7 once the terminal 135 is energized by the closure of the switch 76.

The oscillator circuit 154 has an output voltage $V_a$ that is generated for a time period that is varied in accordance with the difference between the voltages $V_n$ and $V_r$. The output of the oscillator circuit 154 is shown on the bottom line curve of FIG. 7 wherein the output extends for a period $T_1$ during a preset time interval T. As may be seen from this figure, the time $T_1$ continues to increase until the voltage $V_r$ has decayed to the point $T_1$ at which it is constant and for a fairly substantial time period. During the time $T_1$ when the oscillator 154 is providing its output, the firing of the spark plugs 143 will be disabled.

This disabling is achieved by providing a shunting circuit that prevents charging of the capacitor 141. This shunting circuit includes an SCR 157 that has its output connected to ground via a resistor 158. The SCR 157 has its gate controlled by a gate circuit 159 that receives the output from the oscillator circuit 154 and which energizes the gate of the SCR 157 for a time $T_1$ as set by the oscillator circuit 154. An LED 161 is also provided in the circuit from the SCR 157 with an interposed resistor 162 so as to provide a flashing indication that the ignition is being disabled to reduce the engine speed.

It should be noted that the time P1 is effective to stop firing of the spark plug 143 for a given time interval during a given time period. Hence, the spark plug 143 will not fire for each revolution of the engine and the engine speed will, accordingly, be reduced so as to reduce the consumption of lubricant from the delivery tank 32 so as to afford further protection.

The normal operation of the system as the lubricant is depleted from both the storage tank 31 and delivery tank 32 is, therefore, that first the green on light 103 will be illuminated until the level in the storage tank 31 falls. At this time, the green light 103 will be extinguished and the yellow caution light 104 will be illuminated. When the switch 76 is closed due to the low lubricant level in the delivery tank 32, the yellow caution light 104 will be extinguished and the red warning light 105 and buzzer 106 will go on. However, during the abnormal situation that the level in the storage tank 31 is at or higher than the level 45, the switch 57 will be closed and the green on light 103 will be illuminated at the same time that the red warning light 105 is illuminated. This will provide the operator with an indication that there has been a failure in the system connecting the storage tank 31 with the delivery tank 32 since there is low lubricant in the delivery tank 32, but sufficient lubricant in the storage tank 31. This may occur either due to failure of the pump 36, its driving motor 39 or rupture of one of the interconnecting connections. Therefore, the device also provides a troubleshooting function.

Figure 11:
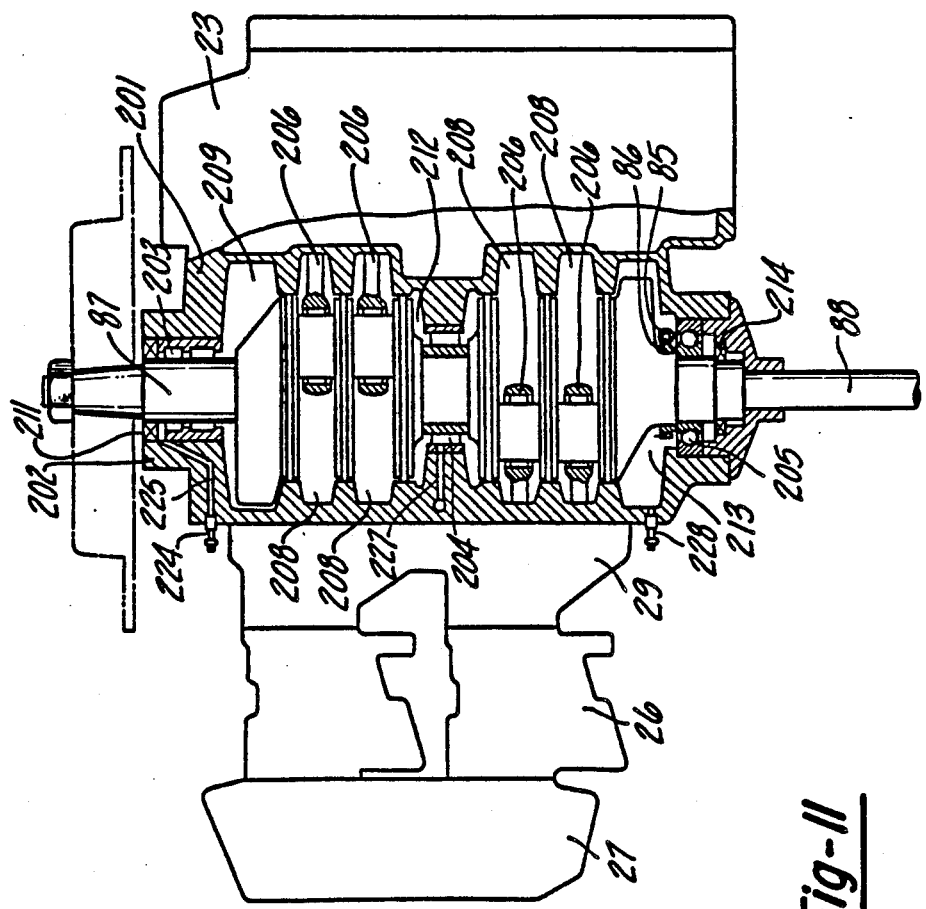
FIG. 11 is a side elevational view of the engine, with a portion broken away, of the embodiment of FIG. 10.

Embodiment Of FIGS. 10 And 11

In the previously described embodiment, the engine 23 was lubricated by delivering all of the lubricant to the runners of the intake manifold serving each of the crankcase chambers. Although such a lubrication system may be very adequate, in some instances, it may be desirable to provide more lubrication to certain components of the engine than to others or to specifically lubricate some components in a different manner than others. FIGS. 10 and 11 show an embodiment wherein such different lubrication delivery is achieved. Since the main control system and delivery of lubricant to the lubricant delivery tank 32 is the same in this emboidment as in the previously described embodiment, these components have not been illustrated again in any significant detail nor will they be described again. In accordance with this embodiment, the crankshaft 87 is supported between a cylinder block 201 and a crankcase 202 in a generally known manner as by means of spaced main bearings 203, 204 and 205. The bearings 203, 204 and 205 may be of different types such as ball bearings in the case of the bearing 205, roller bearings in the case of bearings 203 and 204. Various other types of bearing arrangements may be employed.

The engine 23 of this embodiment, like the engine of the embodiment of FIGS. 1 through 9, is depicted as being of the V4 type. Thus, connecting rods 206 interconnect pistons 207 with the respective throws of the crankshaft 87. The crankcase chamber defined between the cylinder block 201 and crankcase 202 is divided into separate vertically spaced sealed chambers 208 which communicate with each of the respective pistons 207 through transfer passages in a known manner. These chambers are sealed from each other and a further chamber 209 is provided above the chamber 206 and adjacent the bearing 203. A seal 211 surrounds the crankshaft above the bearing 203 so as to seal the chamber 209. In a similar manner, a chamber 212 encircles the bearing 204 and is sealed from the adjacent chambers 208. A lower chamber 213 is positioned between the lowermost of the crankcase chambers 208 and the bearing 205. The drive gears 85 and 86 for the lubricant pump 33, which is the same as the embodiment of FIGS. 1 through 9, is located within this lowermost chamber 213. Again, a seal 214 encircles the crankshaft 87 so as to seal this lower chamber.

As with the previously described embodiment, the oil pump 33 has a plurality of outlets, each of which serves a respective conduit 215 that discharges lubricant under pressure into a respective runner of the intake manifold 29. As with the previously described embodiment, there is one such conduit 215 for each manifold runner or each crankcase chamber 208. Thus, the rod bearings in the chambers 208 will be lubricated by the lubricant that is delivered into the induction system for entry into the chambers 208 through the manifold 29.

In addition, the lubricant pump 33 has a further discharge conduit 216 that delivers to a lubricant distributor 217. The lubricant distributor 217 has a plurality of discharge outlets 218, 219, 221, 222 and 223. The outlets 218, 219 and 221 through 223 may be supplied with lubricant at the same or different pressures, depending upon the components to be lubricated and other design factors.

The conduit 218 supplies a fitting 224 that communicates with a passage 225 formed in the cylinder block and terminating at the bearing 203. Thus, the conduit 218 lubricates the bearing 203 with the excess oil being delivered to the chamber 209.

The conduit 219 serves a fitting 226 which communicates with a passage 227 in the crankcase 202 which terminates at the bearing 204 so as to lubricate this bearing. The excess lubricant is delivered to the chamber 212.

The conduit 221 terminates at a fitting 228 which opens directly into the crankcase chamber 213 so as to lubricate the lubricating pump drive gears 85 and 86 and also the lower main bearing 205.

The conduit 222 terminates at a pair of fittings 229 that are disposed in the cylinder block 201 and may either extend into areas adjacent the bores of the cylinders in which the pistons 207 reciprocate or, alternatively, may terminate within the transfer passages that transfer the fuel/air charge from the respective chambers 208 to the area above the pistons 207.

The conduit 223 terminates at a fitting 231 that may be utilized to lubricate any other component of the engine and, for example, may terminte in a separate passage in the intake manifold 29 so as to provide further lubricant to one of the runners.

Figure 12:
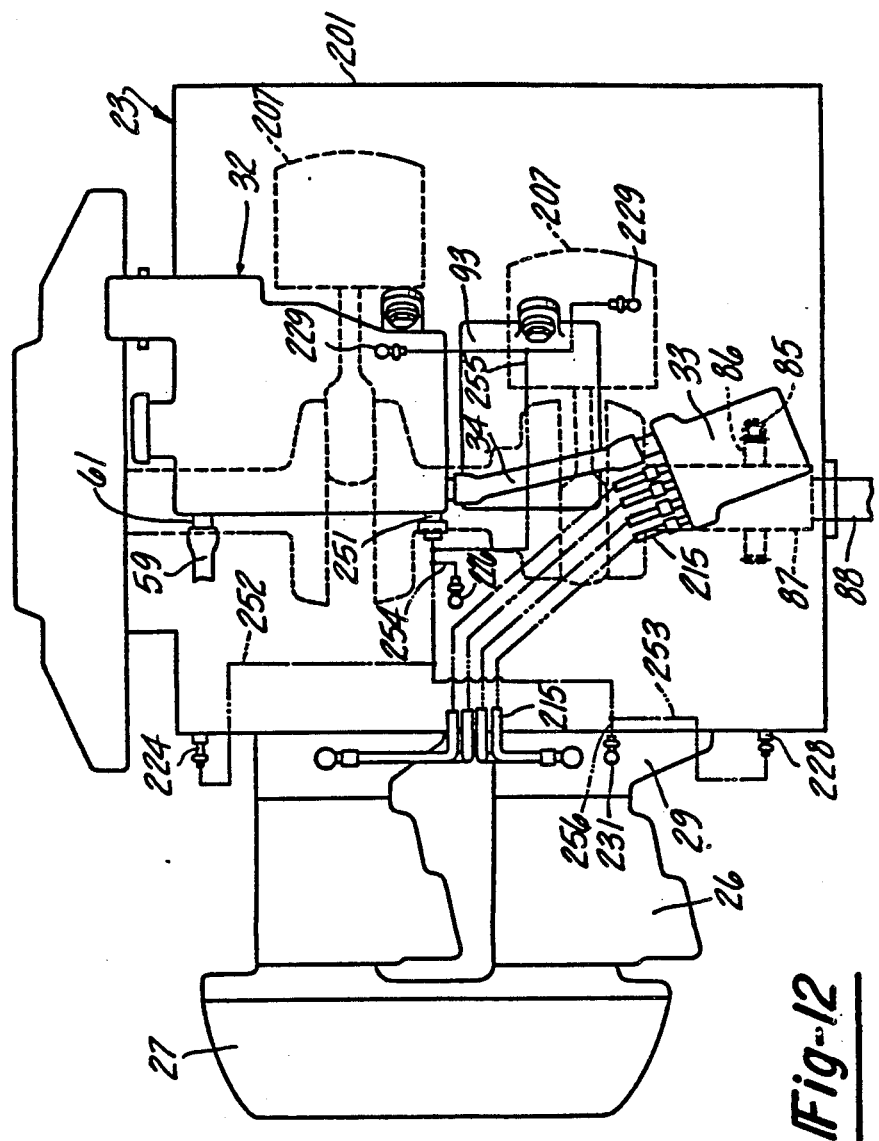
FIG. 12 is an enlarged side-elevational view, in part similar to FIGS. 2 and 10, showing a further embodiment of the invention.
Figure 13:
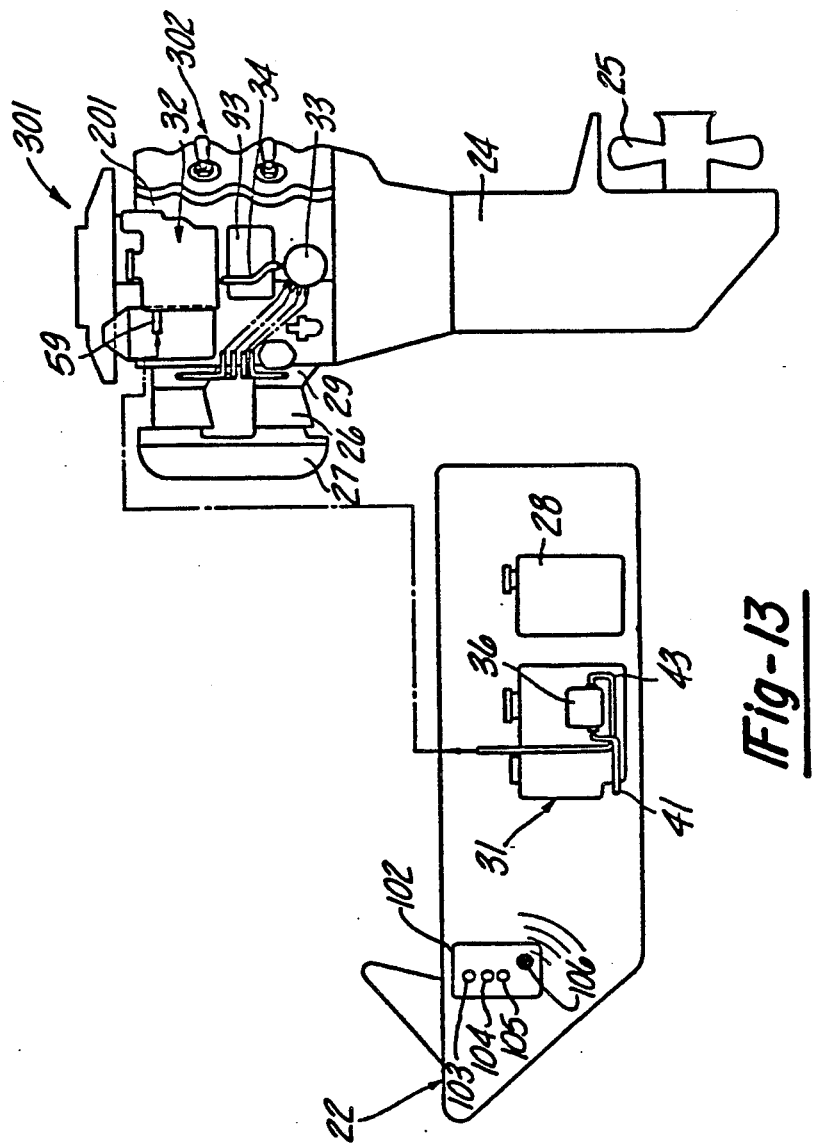
FIG. 13 is a partially schematic side elevational view of a watercraft and outboard motor constructed in accordance with a yet further embodiment of the invention.
Figure 14:
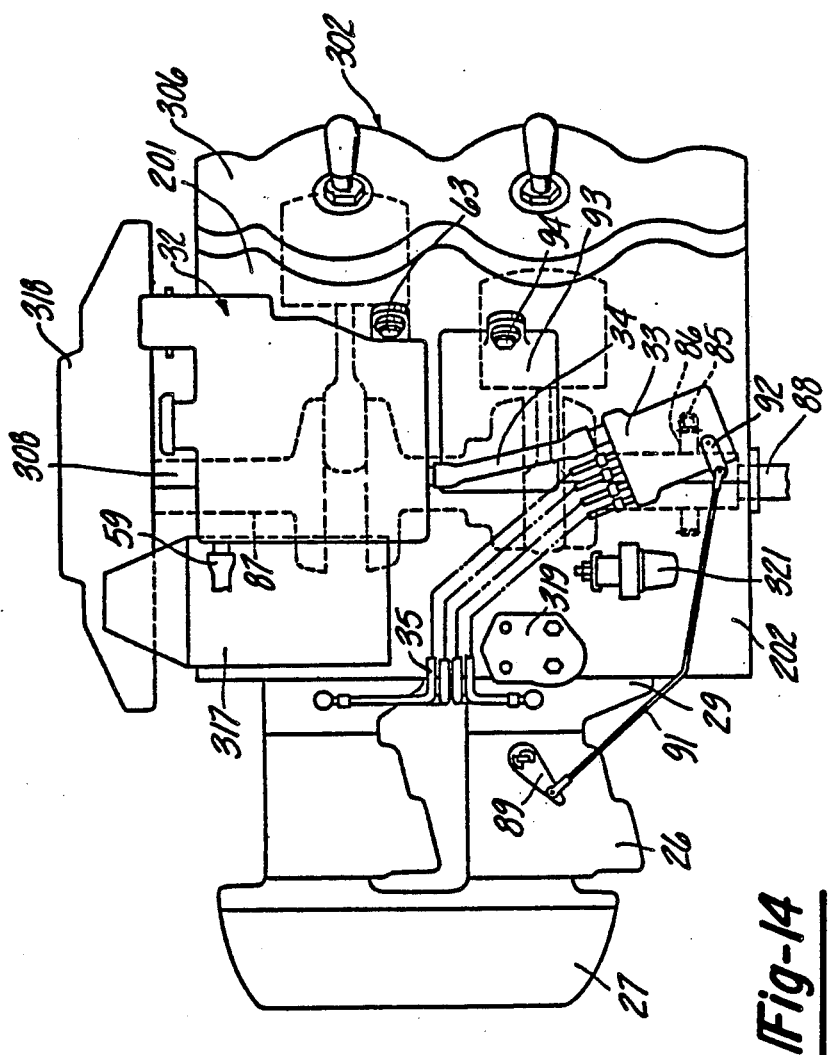
FIG. 14 is an enlarged side elevational view of the power head of the outboard motor shown in FIG. 13.
Figure 15:
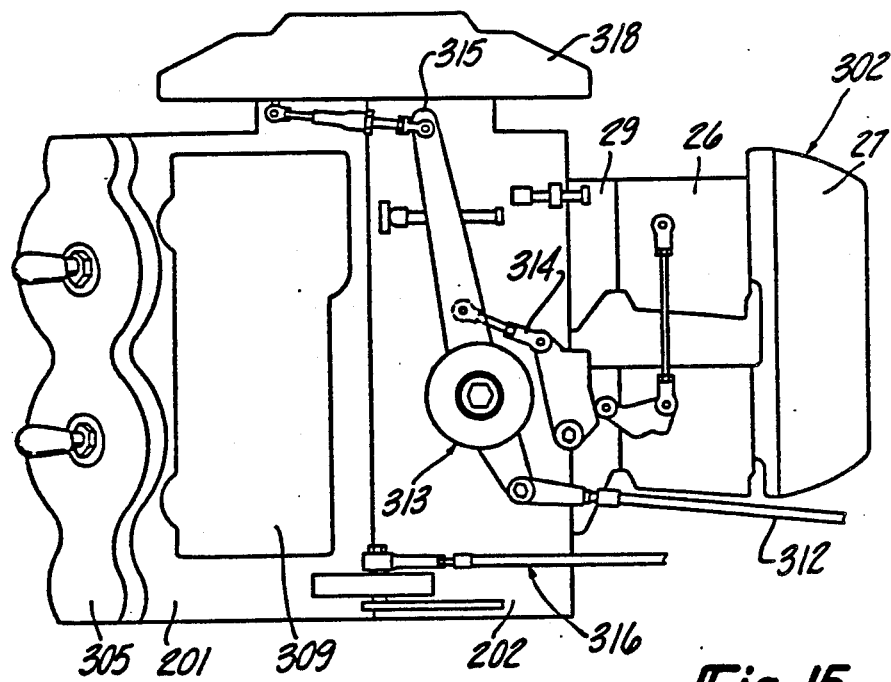
FIG. 15 is an enlarged side elevational view of the power head shown in FIG. 14 looking from the opposite side.

Embodiment Of FIG. 12

In the embodiment of FIGS. 10 and 11, certain components of the engine were lubricated at one pressure by the lubricant pump 33 and other components were lubricated at different pressures through the distributor 217. Rather than utilizing the lubricant pump 33 to supply all of the lubricant, some lubricant may be supplied to certain components of the engine either by gravity flow or by suction. FIG. 12 illustrates such an embodiment.

In this embodiment, the lubricating points, and specifically the fittings 224, 226, 228, 229 and 231 are the same as in the embodiment as FIGS. 10 and 11 and their description and the components lubricated by them will not be repeated. In this embodiment, the lubricant pump 33 also delivers lubricant to the individual runners of the intake manifold 29 through the conduits 215 as in the previously described embodiments.

In addition, a lubricant outlet fitting 251 is formed in the lower end of the delivery tank 32 and supplies a plurality of conduits that deliver oil to the respective fittings in a manner to be described. This delivery will be partially under gravity and partially as a result of the negative pressures exerted at the various fittings under certain running conditions. If desired, appropriate check valves may be positioned at the respective fittings so as to prevent pressurization of the various lines under reverse pressure conditions.

A line 252 extends from the fitting 251 to the fitting 224 so as to lubricate the upper main bearing. A line 253 extends to the fitting 228 to lubricate the lower main bearing and oil pump drive gears 85 and 86. A line 254 extends from the fitting 251 to the fitting 226 so as to lubricate the intermediate main bearing. A line 255 extends from the fitting 251 to the fitting 229 so as to lubricate the cylinder walls, pistons and piston rings. A line 256 extends to the fitting 231 so as to deliver lubricant to it and the components which are lubricated by it. In all other regards, this embodiment is the same as those previously described and for that reason, further details of the already described constructions will not be repeated. Where components are the same as those previously described, they have been identified by the same reference numerals.

Embodiment Of FIGS. 13 Through 16

As has been noted, in connection with outboard motors, it is extremely desirable, if not essential that the arrangement be such so as to afford a compact overall configuration. FIGS. 13 through 16 show an embodiment wherein the components are all located in such a way as to achieve a compact arrangement. In these figures, many of the components are the same as those illustrated in conjunction with the previously described embodiments and where this is the case, those components have been identified by the same reference numerals and their construction and operation will not be repeated, except insofar as may be necessary to understand the invention as applied to these figures. The construction and operation of the separate lubricating system is substantially the same as that as the previously described embodiments and for that reason, the construction and operation of these components will also not be described again in detail, except insofar as to explain the orientation of these components.

An outboard motor constructed in accordance with this embodiment is identified generally by the reference numeral 301. The motor 301 includes a power head 302 that includes an internal combustion engine of the two-cycle type. The engine 302 is, as has been aforenoted, of the V4 type and includes a cylinder block 201 that defines a pair of cylinder banks 303 and 304. Cylinder heads 305 and 306 are affixed to the cylinder banks 303 and 304, respectively, in a known manner. The crankcase 202 extends from the V of the banks 303 and 304 so that the engine 302, when viewed from above, has a generally "Y" shape with a recess 307 formed between the bank 303 and the crankcase 202 and a recess 308 formed between the bank 304 and the crankcase 202.

Contained within the recess 307 and carried by the cylinder bank 303 is a control box, indicated generally by the reference numeral 309, that may contain such components and the ignition unit, electrical controls and various other control components associated with the engine 302 or the outboard motor 301, per se.

Figure 16:
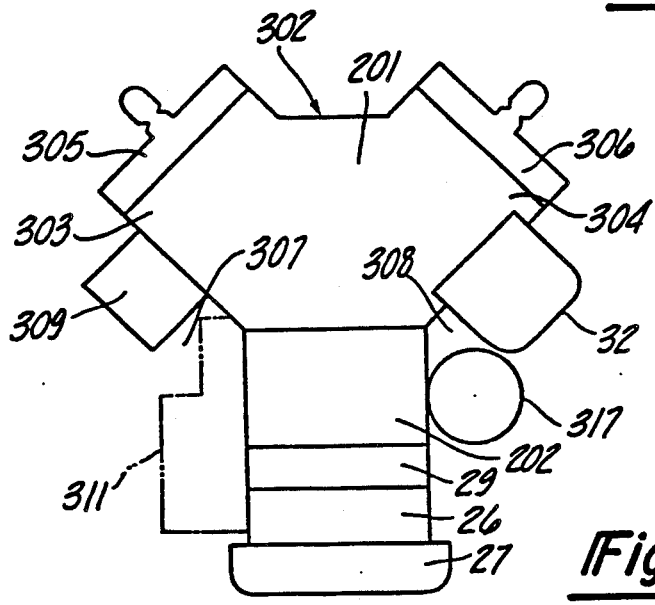
FIG. 16 is a top plan view of the power head of this embodiment.

Also contained within the recess 307 and carried primarily by the crankcase 202 is the throttle, spark advance and transmission control mechanism which encompasses an area shown by the dot-dash line 311 in FIG. 16. This includes an operator controlled throttle link 312 that is connected to a cam and operator mechanism 313 that is journalled on the crankcase 202 and which controls a first linkage 314 that is connected to the throttle valves of the carburetors 26 in a known manner. In addition, a linkage 315 connects the control 313 to the mechanical spark advance of the engine. A transmission control link 316 is supported in this area and operates the forward/neutral/reverse transmission of the lower unit of the outboard motor 301 in a known manner. This linkage arrangement for controlling the throttle, spark advance and shift mechanism of the transmission may be of any conventional configuration and is described only so as to show how it may be located compactly within the surrounding protecting cowling of the outboard motor without adding unduly to the space requirements.

A further number of components are contained within the cavity 308 defined by the cylinder bank 304 and the crankcase 202. These include the lubricant delivery tank 32, lubricating pump 33 and its throttle operated control. In addition, an electric starter 317 is provided in this cavity and is adapted to cooperate with the flywheel 318 of the engine 302 for achieving electric starting in a known manner. This portion of the engine also mounts an engine driven fuel pump 319 that receives filtered fuel from the tank 28 by means including a fuel filter 321. It should be readily apparent, therefore, that a relatively compact construction is achieved and yet one which facilitates servicing of the various components.

Embodiments Of FIGS. 17 Through 19

As has been previously noted, it is desirable to provide a venting system for the lubricant delivery tank 32 so as to insure that air can enter and leave the tank to compensate for changes in the level of lubricant therein. As was also noted, the fact that the outboard motor is adapted to be tilted up and steered requires positioning of these venting means in such an arrangement that lubricant cannot be discharged from the delivery tank 32 through these venting means when the motor is tilted up. In connection with the embodiment of FIGS. 1 through 9, spillage from the delivery tank 32 when the motor is tilted up is precluded by having the vent valve 83 disposed to admit air to the delivery tank 32 and the vent valve 82 serves to discharge air from the delivery tank 32. This valving relationship is employed since the valve 83 will be the lowermost of the two valves when the motor is tilted up. Thus, its inherent position will tend to preclude the discharage of lubricant from the delivery tank 32 over such tilting up conditions. FIGS. 17 through 19 show various other venting arrangements wherein such spillage during tilting up operation is avoided.

Referring first to FIGS. 17 and 18, the general construction of the delivery tank 32 and its internal components, including the sensor unit 65, is the same as the previously described embodiments and, for that reason, these components will not be described again in detail. The delivery tank 32 is provided with a raised portion 351 at its rear end that defines an air cavity 352 above the uppermost level of lubricant indicated by the line 77. A forwardly facing air inlet vent valve 353 is provided in the raised portion 351 and a sidewardly facing outlet air vent valve 354 is provided in one of its sidewalls. The vent valves 353 and 354 are designed so as to permit the flow of air into and out of the cavity 352 upon predetermined pressure variations. As shown in FIG. 18, these valves are disposed relative to lines LL and RR so that lubricant cannot pass from either of them when the engine is tilted up about its horizontally extending tilt axis and regardless of its steered position about the vertically extending steering axis. The line RR indicates the lubricant level on a filled delivery tank 32 when the engine is tilted up and steered to its extreme right-hand position. The line LL illustrates the corresponding condition when steered to the full left lock. Therefore, it should be apparent that the likelihood of lubricant leakage is substantially precluded.

The likelihood of leakage can be even further improved if the internal portion of the cavity 352 is provided with a horizontally extending air baffle 355 which leaves only a small gap 356 through which the cavity 352 may communicate with the lubricant in the tank 32.

FIG. 19 illustrates another embodiment of baffling arrangement. In this embodiment, the venting valves are located in the same location; however, the cavity 352 is closed by means of a cover plate 361 from which a baffle plate 362 extends. The baffle plate 362 leaves only a narrow annular gap 363 through which the cavity 352 may communicate with the area above the lubricant the tank 32.

SUMMARY

It should be readily apparent that a variety of embodiments have been illustrated and described, each of which provides an effective lubricating system that has particular utility with outboard motors and which will insure against motor damage and yet allow long cruising intervals. The invention has been described in conjunction with engines having V4 arrangements; however, it should be readily apparent that many features of the invention may be used in conjunction with engines having other cylinder configurations or, in fact, other than reciprocating engines. Also, the warning system as illustrated and described has many advantages; however, many of the features may be used in conjunction with other types of electrical warning systems than those disclosed. Various other changes and modifications may be made, without departing from the spirit and scope of the invention, as defined by the appended claims.

I claim:

1. In a lubricating system for a two-cycle internal combustion engine comprising a relatively large remotely positioned lubricant storage tank, a relatively small lubricant delivery tank positioned in proximity to the engine for delivering lubricant to its lubricating system and vertically above said storage tank, and pump means for transferring lubricant from said storage tank to said delivery tank, the improvement comprising said pump means being located in proximity to said storage tank and above the lower wall thereof, conduit means extending from the outlet of said pump means to said delivery tank, and trap means in said conduit means for maintaining lubricant in proximity to the pump outlet for precluding said pump means from running dry.

2. A lubricating system as described in claim 1 wherein the pump means comprises a positive displacement pump.

3. In a lubricating system as described in claim 1 wherein the pump means and the trap mean are positioned externally of the tanks.

4. In a lubricating system as described in claim 1 wherein the trap means comprises an outlet from the pump means that extends first vertically downwardly and subsequently vertically upwardly to provide the trap.

5. In a lubricating system as described in claim 4 wherein the pump means and the trap means are positioned externally of the tanks.

* * * * *